(12) United States Patent
Bruguera (10) Patent No.: US 11,281,428 B2
(45) Date of Patent: Mar. 22, 2022

(54) CONVERSION CIRCUITRY

(71) Applicant: Arm Limited, Cambridge (GB)

(72) Inventor: Javier Diaz Bruguera, Austin, TX (US)

(73) Assignee: ARM LIMITED, Cambridge (GB)

( * ) Notice: Subject to any disclaimer, the term of this patent is extended or adjusted under 35 U.S.C. 154(b) by 123 days.

(21) Appl. No.: 16/299,322

(22) Filed: Mar. 12, 2019

(65) Prior Publication Data
US 2020/0293279 A1  Sep. 17, 2020

(51) Int. Cl.
*G06F 7/48* (2006.01)

(52) U.S. Cl.
CPC .................. *G06F 7/4824* (2013.01)

(58) Field of Classification Search
CPC . G06F 7/4824; G06F 7/49; G06F 7/60; G06F 7/487; G06F 7/4873; G06F 7/537; G06F 7/5375; G06F 7/5525; H03M 7/00; H03M 7/02; H03M 7/04
See application file for complete search history.

(56) References Cited

U.S. PATENT DOCUMENTS

| | | | |
|---|---|---|---|
| 5,113,363 A * | 5/1992 | Orsino | G06F 7/4824 708/523 |
| 5,404,324 A | 4/1995 | Colon-Bonet | |
| 2003/0009501 A1 | 1/2003 | Tang | |
| 2006/0129623 A1 * | 6/2006 | Uesugi | G06F 7/4824 708/490 |
| 2017/0344342 A1 * | 11/2017 | Bruguera | G06F 7/49947 |

OTHER PUBLICATIONS

V. Charoensiri and A. Surarerks, "On-the-fly Conversion from Signed-Digit Number System into Complement Representation," 2006 International Symposium on Communications and Information Technologies, Bangkok, 2006, pp. 1056-1061, doi: 10.1109/ISCIT.2006.339939. (Year: 2006).*

M. E. Louie and M. D. Ercegovac, "On digit-recurrence division implementations for field programmable gate arrays," Proceedings of IEEE 11th Symposium on Computer Arithmetic, Windsor, Ontario, Canada, 1993, pp. 202-209, doi: 10.1109/ARITH.1993.378091. (Year: 1993).*

(Continued)

*Primary Examiner* — Emily E Larocque
*Assistant Examiner* — Huy Duong
(74) *Attorney, Agent, or Firm* — Nixon & Vanderhye, P.C.

(57) ABSTRACT

A data processing apparatus is provided to convert a plurality of signed digits to an output value, the data processing apparatus comprising: receiver circuitry to receive, at each of a plurality of iterations, a signed digit from the plurality of signed digits, and previous intermediate data. Conversion circuitry performs a negative-output conversion from the signed digit to an unsigned digit, such that the output value comprising the unsigned digit is negative. Concatenation circuitry concatenate bits of the unsigned digit and bits of the previous intermediate data to produce updated intermediate data and output circuitry provides the updated intermediate data as the previous intermediate data of a next iteration. After the plurality of iterations, the output circuitry outputs at least part of the updated intermediate data as the output value.

13 Claims, 5 Drawing Sheets

(56) References Cited

OTHER PUBLICATIONS

Ercegovac and Lang, "On-the-Fly Conversion of Redundant into Conventional Representations," in IEEE Transactions on Computers, vol. C-36, No. 7, pp. 895-897, Jul. 1987, doi: 10.1109/TC.1987.1676986. (Year: 1987).*

Office Action dated Jan. 29, 2021, issued in U.S. Appl. No. 16/550,565 to Bruguera (7 pages).

Ercegovac, et al., "ON-the-Fly Rounding", IEEE Transactions on Computers, vol. 41, No. 12, Dec. 1992, pp. 1497-1503.

Ercegovac, et al., "ON-the-Fly Rounding for Division and Square Root", Computer Science Department, School of Engineering and Applied Science, pp. 169-173. (Year: 1989).

* cited by examiner

FIG. 1

| $q_{k+1}$ | $Q[k+1]$ | $QM[k+1]$ |
|---|---|---|
| +4 | {QM[k], 100} | {QM[k], 011} |
| +3 | {QM[k], 101} | {QM[k], 100} |
| +2 | {QM[k], 110} | {QM[k], 101} |
| +1 | {QM[k], 111} | {QM[k], 110} |
| 0 | {Q[k], 000} | {QM[k], 111} |
| −1 | {Q[k], 001} | {Q[k], 000} |
| −2 | {Q[k], 010} | {Q[k], 001} |
| −3 | {Q[k], 011} | {Q[k], 010} |
| −4 | {Q[k], 100} | {Q[k], 011} |

200

| $q_{k+1}$ | $Q[k+1]$ | $QM[k+1]$ |
|---|---|---|
| +4 | {Q[k], 100} | {Q[k], 011} |
| +3 | {Q[k], 011} | {Q[k], 010} |
| +2 | {Q[k], 010} | {Q[k], 001} |
| +1 | {Q[k], 001} | {Q[k], 000} |
| 0 | {Q[k], 000} | {QM[k], 111} |
| −1 | {QM[k], 111} | {QM[k], 110} |
| −2 | {QM[k], 110} | {QM[k], 101} |
| −3 | {QM[k], 101} | {QM[k], 100} |
| −4 | {QM[k], 100} | {QM[k], 011} |

CONVERSION CIRCUITRY

TECHNICAL FIELD

The present disclosure relates to data processing. For instance, the present techniques could be used in relation to the conversion between redundant and non-redundant representation.

DESCRIPTION

In a data processing apparatus, data can be transmitted in what is known as redundant representation where the data is represented as a pair of words rather than a single word. For instance, the value −4 could be represented as the pair of words (0, 4), while the value +4 could be represented as the pair of words (4, 0). It will be appreciated that such representation enables some circuits (e.g. Carry-Save Adders) to operate more quickly or efficiently. However, not all circuits use such representation, and conversion to non-redundant representation may be needed. Where data is received one digit at a time (e.g. in digit recurrence circuits, which may perform digit recurrence division, square root, logarithms, etc.), there are two possibilities for performing the conversion. A first possibility is to perform the conversion "on the fly", e.g. to convert each digit as it is received. However, previously proposed algorithms for "on the fly" conversion do not work when the overall number being output (comprising the digits) is negative. A second possibility is to wait for all the digits to be received and then to perform conversion all at once. This is amenable to the situation in which the overall number to be output is negative—in particular, the number to be output can be treated as a positive number and then inverted once it has been converted. However, this second process introduces latency since it is necessary to wait for the conversion to take place once all the digits have been received. Furthermore, the process of inversion (for negative numbers) can also necessitate addition circuitry, which uses up valuable space (and therefore power) in the circuit.

SUMMARY

Viewed from a first example configuration, there is provided a data processing apparatus to convert a plurality of signed digits to an output value, the data processing apparatus comprising: receiver circuitry to receive, at each of a plurality of iterations, a signed digit from the plurality of signed digits, and previous intermediate data; conversion circuitry to perform a negative-output conversion from the signed digit to an unsigned digit, such that the output value comprising the unsigned digit is negative; concatenation circuitry to concatenate bits of the unsigned digit and bits of the previous intermediate data to produce updated intermediate data; and output circuitry to provide the updated intermediate data as the previous intermediate data of a next iteration, wherein after the plurality of iterations, the output circuitry is adapted to output at least part of the updated intermediate data as the output value.

Viewed from a second example configuration, there is provided a data processing method to convert a plurality of signed digits to an output value, the data processing method comprising: receiving, at each of a plurality of iterations, a signed digit from the plurality of signed digits, and previous intermediate data; performing a negative-output conversion from the signed digit to an unsigned digit, such that the output value comprising the unsigned digit is negative; concatenating bits of the unsigned digit and bits of the previous intermediate data to produce updated intermediate data; and providing the updated intermediate data as the previous intermediate data of a next iteration, wherein after the plurality of iterations, at least part of the updated intermediate data is output as the output value.

Viewed from a third example configuration, there is provided a data processing apparatus for converting a plurality of signed digits to an output value, the data processing apparatus comprising: means for receiving, at each of a plurality of iterations, a signed digit from the plurality of signed digits, and previous intermediate data; means for performing a negative-output conversion from the signed digit to an unsigned digit, such that the output value comprising the unsigned digit is negative; means for concatenating bits of the unsigned digit and bits of the previous intermediate data to produce updated intermediate data; and means for providing the updated intermediate data as the previous intermediate data of a next iteration, wherein after the plurality of iterations, the means for providing the updated intermediate data outputs at least part of the updated intermediate data as the output value.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with some example configurations, there is provided a data processing apparatus to convert a plurality of signed digits to an output value, the data processing apparatus comprising: receiver circuitry to receive, at each of a plurality of iterations, a signed digit from the plurality of signed digits, and previous intermediate data; conversion circuitry to perform a negative-output conversion from the signed digit to an unsigned digit, such that the output value comprising the unsigned digit is negative; concatenation circuitry to concatenate bits of the unsigned digit and bits of the previous intermediate data to produce updated intermediate data; and output circuitry to provide the updated intermediate data as the previous intermediate data of a next iteration, wherein after the plurality of iterations, the output circuitry is adapted to output at least part of the updated intermediate data as the output value.

In the above example configurations, a number made up from a plurality of digits is output. The plurality of digits are received in signed form (e.g. in redundant representation) one at a time and are converted as they are received to unsigned form in order to produce an output number (the output number being the number in, e.g. non-redundant-representation). The conversion circuitry performs a negative-output conversion on the signed digits, i.e. a conversion where the output number is negative. The apparatus therefore performs an "on the fly" negative-output conversion. Conversion circuitry takes each signed digit and produces an unsigned digit. The conversion performed on the signed digit depends on a value of the signed digit. Having performed the conversion, the unsigned digit is concatenated to the current intermediate data to create updated intermediate data. This updated intermediate data is then provided back to the data processing apparatus for the next iteration. Over the plurality of iterations, the intermediate data is built up and eventually, at least part of this is output as the output number.

In some embodiments, the receiver circuitry is adapted to also receive an indication of whether the output value is to be negative; the conversion circuitry is adapted to perform a positive-output conversion from the signed digit to the unsigned digit, such that the output value comprising the unsigned digit is positive; and the conversion circuitry is adapted to select between the negative-output conversion and the positive-output conversion in dependence on the indication. In many digit recurrence circuits, the digit recurrence process is performed using positive numbers with an inversion to a negative number performed later. For instance, in integer division, if one of the operands is negative, then it is known that the output will also be negative. However, the division operation will treat both numbers as being positive and then invert the result at the end. In these embodiments, the data processing apparatus can therefore be switched between generating positive outputs or negative outputs based on the indication.

In some embodiments, the signed digits are in redundant representation; and the output value is in non-redundant representation. Redundant representation is where a number is represented by a pair of words rather than a single word, as is typically the case in non-redundant representation. For instance, the number '3' could be redundantly-represented as the words (0, 3). The set of digits that are available for each word depend on the radix (r). Such representation allows certain circuits (such as Carry Save Adders) to operate more efficiently. However, some circuits cannot or do not use such representation and so conversion between the two forms can be necessary.

In some embodiments, the data processing apparatus comprises: selection circuitry to speculatively generate, based on the indication, prior to the signed digit being received, a set of candidate unsigned digits for each possible value of the signed digit, and to select the unsigned digit from the set of candidate unsigned digits once the signed digit is received. By speculatively generating a set of candidate unsigned digits before the signed digit is received, some of the conversion process can be completed ahead of time. In other words, part of the conversion process (e.g. the part that depends on the indication of whether the output is to be negative) can be carried out while the apparatus is waiting for the signed digit to be provided. This therefore removes part of the conversion process from the critical path and increases the efficiency of the data processing apparatus. The final step of conversion is merely a selection between the candidates, which occurs once the signed digit is received and which can be done quickly.

In some embodiments, the selection circuitry is adapted to select the unsigned digit that corresponds with the signed digit from the candidate unsigned digits.

In some embodiments, the intermediate data comprises a first value and a second value; the conversion circuitry is adapted to perform a further negative-output conversion from the signed digit to a further unsigned digit, and to perform a further positive-output conversion from the signed digit to the further unsigned digit; the conversion circuitry is adapted to select between the further negative-output conversion and the further positive-output conversion in dependence on the indication; and the updated intermediate data comprises an updated first value and an updated second value. In such embodiments, either the positive-output and further positive-output conversions are performed, or the negative-output and further negative-output conversions are performed, depending on the indication. The intermediate data is made up from a pair of values (the first value and the second value) and two conversions may be performed, as previously explained, in order to produce an updated first value and an updated second value. Note that the term "update" does not imply that there must be commonality between the first value and the updated first value and also between the second value and the updated second value. In some embodiments, there is commonality either between the first value and updated first value or between the second value and updated second value. The final result may be made up of either the updated first value, the updated second value, or both values.

In some embodiments, the concatenation circuitry is adapted: if the signed digit is zero and the indication indicates that the output value is to be negative, to produce the updated first value by concatenating the first value with the unsigned digit and to produce the updated second value by concatenating the second value with the further unsigned digit, and otherwise to produce the updated first value by concatenating one of the first value and the second value with the unsigned digit and to produce the updated second value by concatenating the one of the first value and the second value with the further unsigned digit.

In some embodiments, the one of the first value and the second value is dependent on whether the signed digit is positive or negative and the indication. The concatenation that occurs, e.g. the combination of elements that are combined, therefore depends on both the indication and whether the signed digit is positive or negative.

In some embodiments, the conversion circuitry comprises one or more multiplexers to output the unsigned data in dependence on a value of the signed digit.

In some embodiments, the conversion circuitry performs the conversion without addition circuitry. In previously proposed techniques, a positive integer can be converted to a negative integer by determining the two's complement of the positive integer and then adding 1 to the result. This process, however, requires the use of inversion circuitry and addition circuitry, which can lead to a large circuit. This can therefore result in increased power consumption. Furthermore, the entire operation can only be performed once all the signed digits are received, which results in a higher latency than if the circuits are converted "on the fly". By avoiding the use of addition circuitry, these embodiments are able to save on space and power consumption and may be able to produce the negative output value in fewer processor cycles due to performing the conversion "on the fly".

In some embodiments, the data processing apparatus comprises digit recurrence circuitry to perform a digit recurrence operation to produce the plurality of signed digits, wherein in each of the plurality of iterations, one of the plurality of signed digits is provided to the receiver circuitry. Conversion can therefore be performed as each digit is received, rather than having to wait for all of the digits to be received. Consequently, latency is reduced.

In some embodiments, the output value is an integer. As previously explained, conversion of integers into their negative forms can be time consuming, and it is generally necessary to wait for all of the bits (digits) making up the integer to be received before the conversion can be performed. In these embodiments, conversion can be performed as each digit is received, which can result in a reduction of latency.

Particular embodiments will now be described with reference to the figures.

Figure 1:
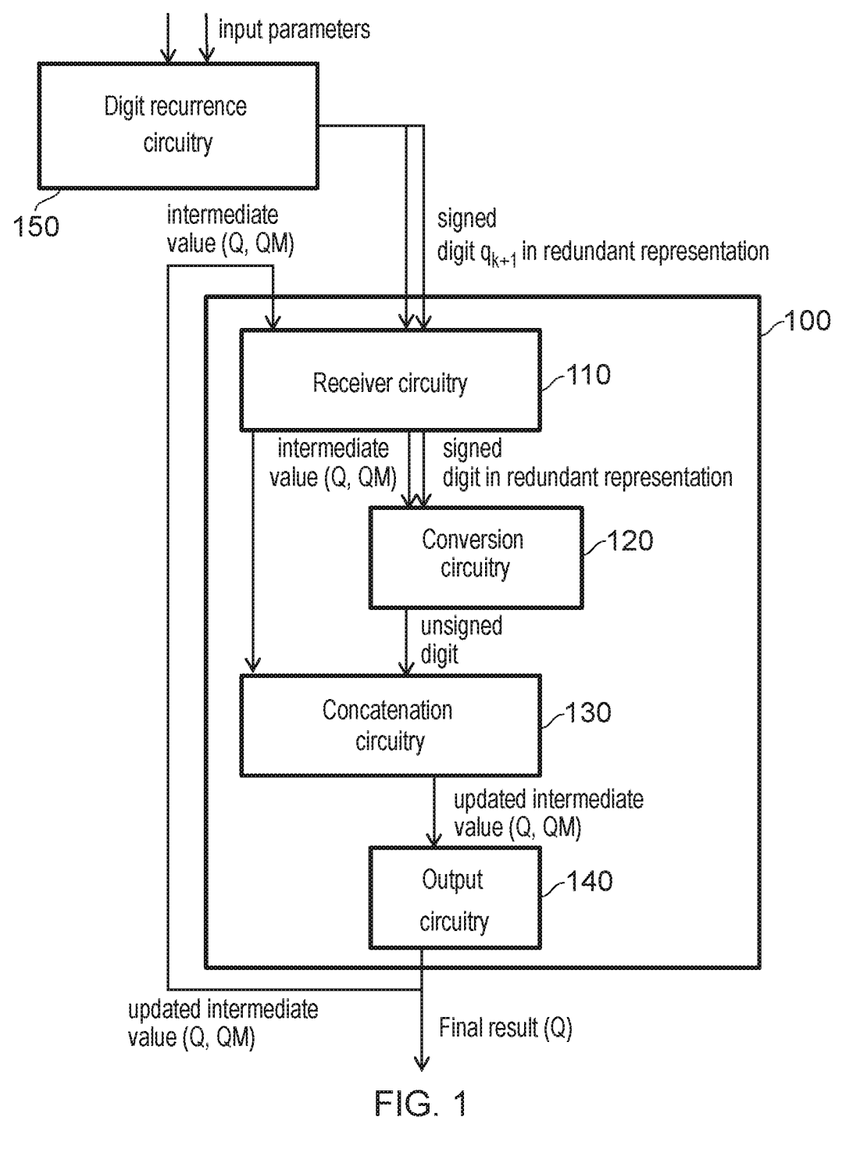
FIG. 1 schematically illustrates an apparatus in accordance with some embodiments.

FIG. 1 illustrates an apparatus in accordance with some embodiments. The apparatus includes receiver circuitry 110 that receives, in redundant-representation, a signed digit $q_{k+1}$ (where k is the number of the iteration). The signed digit $q_{k+1}$ may, for instance, be generated by digit recurrence circuitry 150 that generates a number of signed digits (e.g. one per iteration). The sequence of signed digits in this embodiment forms a positive number that is to be converted to a negative number "on-the-fly". The receiver circuitry 110 also receives intermediate data, which in this embodiment is a pair of words (Q, QM), referred to in the claims as a first value and a second value. These values represent a partial result (Q), and a partial result minus one (QM). The intermediate data may be used as a "working value" for the plurality of iterations for which the data processing apparatus 100 operates. Once the required number of iterations has been performed, the intermediate data (or part thereof) is output as the final result, which corresponds with the sequence of digits received from the digit recurrence circuitry in redundant representation as a negative value in non-redundant-representation. In this case, the word Q is output as the final result.

The conversion circuitry 120 performs a conversion from the signed digit $q_{k+1}$ in redundant-representation to an unsigned digit in non-redundant-representation. The conversion is dependant on the value of the signed digit $q_{k+1}$ and the radix r, which for the purposes of this embodiment is 8. In particular, the signed digit can be constrained to a number of different digits depending on a radix r in which the digit-recurrence circuitry operates. For the purpose of these examples, it would be assumed that the radix r is eight. However the present technique is not limited to this and the below text illustrates how the present technique may be adapted for use with other values of the radix. The unsigned digit generated by the conversion circuitry 120 is passed to the concatenation circuitry 130, which also receives the intermediate data (Q, QM) from the receiver circuitry 110. The concatenation circuitry 130 then performs a concatenation between one of the words (Q or QM) in the intermediate data (Q, QM) and the unsigned digit received from the conversion circuitry 120. This results in an updated intermediate data being produced. The updated value is then passed through to the output circuitry 140, which outputs the updated intermediate data back to the receiver circuitry 110 for a further iteration of the data processing apparatus 100 on a further signed digit received from the digit recurrence circuitry 150. After a certain number of iterations have been performed (e.g. once a desired accuracy level has been produced), the updated intermediate data is provided as the final value.

Figure 2:
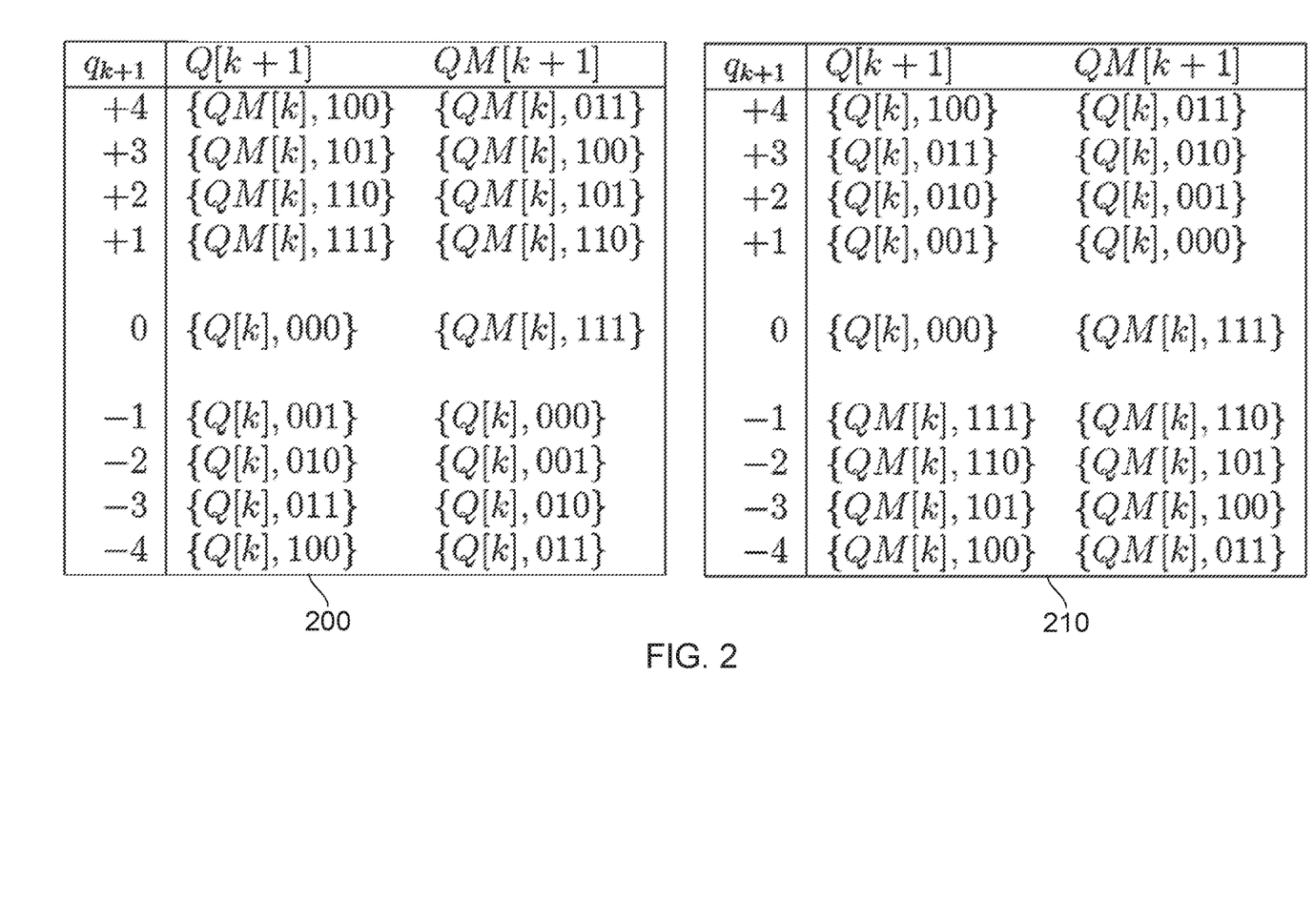
FIG. 2 illustrates a pair of tables that show, for particular digit values, how the intermediate data (made up from a first value and a second value) is updated, depending on whether the overall number being output is positive or negative.

FIG. 2 illustrates a pair of tables 200, 210, which illustrate the conversion performed by the conversion circuitry 120 and the concatenation performed by the concatenation circuitry 130. In this embodiment, the intermediate data is made up of a pair of values Q and QM, and two unsigned digits are generated with two concatenations being performed—one for Q and one for QM.

Where the overall result is positive, the partial result after iteration k−1 of digit recurrence circuitry 150 is given by the equation:

$$Q[k] = \sum_{j=1}^{k} q_i \times r^{-i} \quad (1)$$

Where $q_i$ is the digit output by the digit recurrence circuitry 150 at iteration i. Therefore, after iteration k−1, the partial result is given by the equation:

$$Q[k+1] = Q[k] + q_{k+1} \times r^{-(k+1)}$$

Since $q_{k+1}$ can be negative, the following algorithm can be used for the addition:

$$Q[k+1] = \begin{cases} Q[k] + q_{k+1} \times r^{-(k+1)} & \text{if } q_{k+1} \geq 0 \\ Q[k] - r^{-k} + (r - |q_{k+1}|) \times r^{-(k+1)} & \text{if } q_{k+1} < 0 \end{cases}$$

Defining:

$$QM[k] = Q[k] - r^{-k}$$

the following equations are obtained:

$$Q[k+1] = \begin{cases} Q[k] + q_{k+1} \times r^{-(k+1)} & \text{if } q_{k+1} \geq 0 \\ QM[k] + (r - |q_{k+1}|) \times r^{-(k+1)} & \text{if } q_{k+1} < 0 \end{cases}$$

$$QM[k+1] = \begin{cases} Q[k] + (q_{k+1} - 1) \times r^{-(k+1)} & \text{if } q_{k+1} > 0 \\ QM[k] + ((r-1) - |q_{k+1}|) \times r^{-(k+1)} & \text{if } q_{k+1} \leq 0 \end{cases}$$

The updating rules for Q and QM (when the overall result is positive) are therefore given by the equations:

$$Q[k+1] = \begin{cases} \{Q[k], q_{k+1}\} & \text{if } q_{k+1} \geq 0 \\ \{QM[k], (r - |q_{k+1}|)\} & \text{if } q_{k+1} < 0 \end{cases}$$

$$QM[k+1] = \begin{cases} \{Q[k], q_{k+1} - 1\} & \text{if } q_{k+1} > 0 \\ \{QM[k], (r-1) - |q_{k+1}|\} & \text{if } q_{k+1} \leq 0 \end{cases}$$

Where the notation {x, y} means to concatenate x and y. Note that this is not an arithmetic operation. If the overall result is to be negative, then the sign of the digits in Equation (1) are changed. This is achieved by swapping Q[k] and QM[k] before the concatenation of the new digit (if the new digit is not 0), and by changing the sign of the digit $q_{k+1}$ before concatenating it to the partial result.

The updating rules for Q and QM (when the overall result is negative) are therefore given by the equations:

$$Q[k+1] = \begin{cases} \{QM[k], (r - q_{k+1})\} & \text{if } q_{k+1} > 0 \\ \{Q[k], 0\} & \text{if } q_{k+1} = 0 \\ \{Q[k], |q_{k+1}|\} & \text{if } q_{k+1} < 0 \end{cases}$$

$$QM[k+1] = \begin{cases} \{QM[k], (r - q_{k+1}) - 1\} & \text{if } q_{k+1} > 0 \\ \{QM[k], -1\} & \text{if } q_{k+1} = 0 \\ \{Q[k], |q_{k+1}| - 1\} & \text{if } q_{k+1} < 0 \end{cases}$$

In this embodiment, a radix value (r) of eight is used. In redundant representation, this gives rise to nine possible digits: +4, +3, +2, +1, 0, −1, −2, −3, −4. Each digit is represented by three bits. For instance, the value +4 would be represented by the bits/words (100, 000) and the value −4 would be represented by the bits/words (000, 100). The unsigned digit that is generated by the conversion circuitry 120 is dependant on a value of the received signed digit $q_{k+1}$.

The first table 200 illustrates, for a radix (r) of eight where the overall result is to be made negative (e.g. for a negative-output conversion), for each possible value of the signed digit $q_{k+1}$, the unsigned digit that is generated and the concatenation that is performed. The generated digits and the concatenations are generated based on the above formulae.

For example, if the signed digit $q_{k+1}$ is +3, then the updated value of Q is derived by taking the value QM and concatenating the bits "101". The updated value of QM is produced by taking the original value of QM and concatenating the bits "100". Similarly, if the signed digit $q_{k+1}$ is −1, then the value of Q is generated by taking the original value of Q and concatenating the bits "001". The updated value of QM is produced by taking the current value of Q and appending the bits "000".

If the conversion to a negative number is not to be performed, i.e. if the overall result is to remain positive, then the conversions and concatenations illustrated in table 210 are performed in order to provide a positive-output conversion. For instance, if the signed digit $q_{k+1}$ is 0, then the updated value of Q is provided by taking the input value of Q and concatenating the bits "000". Then, the updated value of QM is produced by taking the input value of QM and concatenating the bits "111". Similarly, if the signed digit is −4, then the updated value of Q is generated by taking the value of QM and appending the bits "100" while the updated value of QM is generated by taking the existing value of QM and appending the bits "011".

This process can then be repeated for the next signed digit that is received, $q_{k+2}$ from the digit recurrence circuitry 150. For example, if the sequence of digits output from the digit recurrence circuitry (across a plurality of iterations) is: 1, −2, −4, 2, 0, −1, and if the overall result was to be negative then the values of Q and QM that are generated at each iteration (k) (using the table 200) would be as follows:

| k | $q_k$ | Q[k] | QM[k] |
|---|---|---|---|
| 0 | — | — | — |
| 1 | 1 | 111 | 110 |
| 2 | −2 | 111 010 | 111 001 |
| 3 | −4 | 111 010 100 | 111 010 011 |
| 4 | 2 | 111 010 011 110 | 111 010 011 101 |
| 5 | 0 | 111 010 011 110 000 | 111 010 011 101 111 |
| 6 | −1 | 111 010 011 110 000 001 | 111 010 011 110 000 000 |

The end result is then output as Q[6], i.e. 111 010 011 110 000 001 (assuming that six iterations take place).

Similarly, if the overall result was to be positive, then the values of Q and QM that are generated at each iteration (k) (using the table 210) would be as follows:

| k | $q_k$ | Q[k] | QM[k] |
|---|---|---|---|
| 0 | — | — | — |
| 1 | 1 | 001 | 000 |
| 2 | −2 | 000 110 | 000 101 |
| 3 | −4 | 000 101 100 | 000 101 011 |
| 4 | 2 | 000 101 100 010 | 000 101 100 001 |
| 5 | 0 | 000 101 100 010 000 | 000 101 100 001 111 |
| 6 | −1 | 000 101 100 001 111 111 | 000 101 100 001 111 110 |

The end result is then output as Q[6], i.e. 000 101 100 001 111 111 (assuming that six iterations take place).

Figure 3:
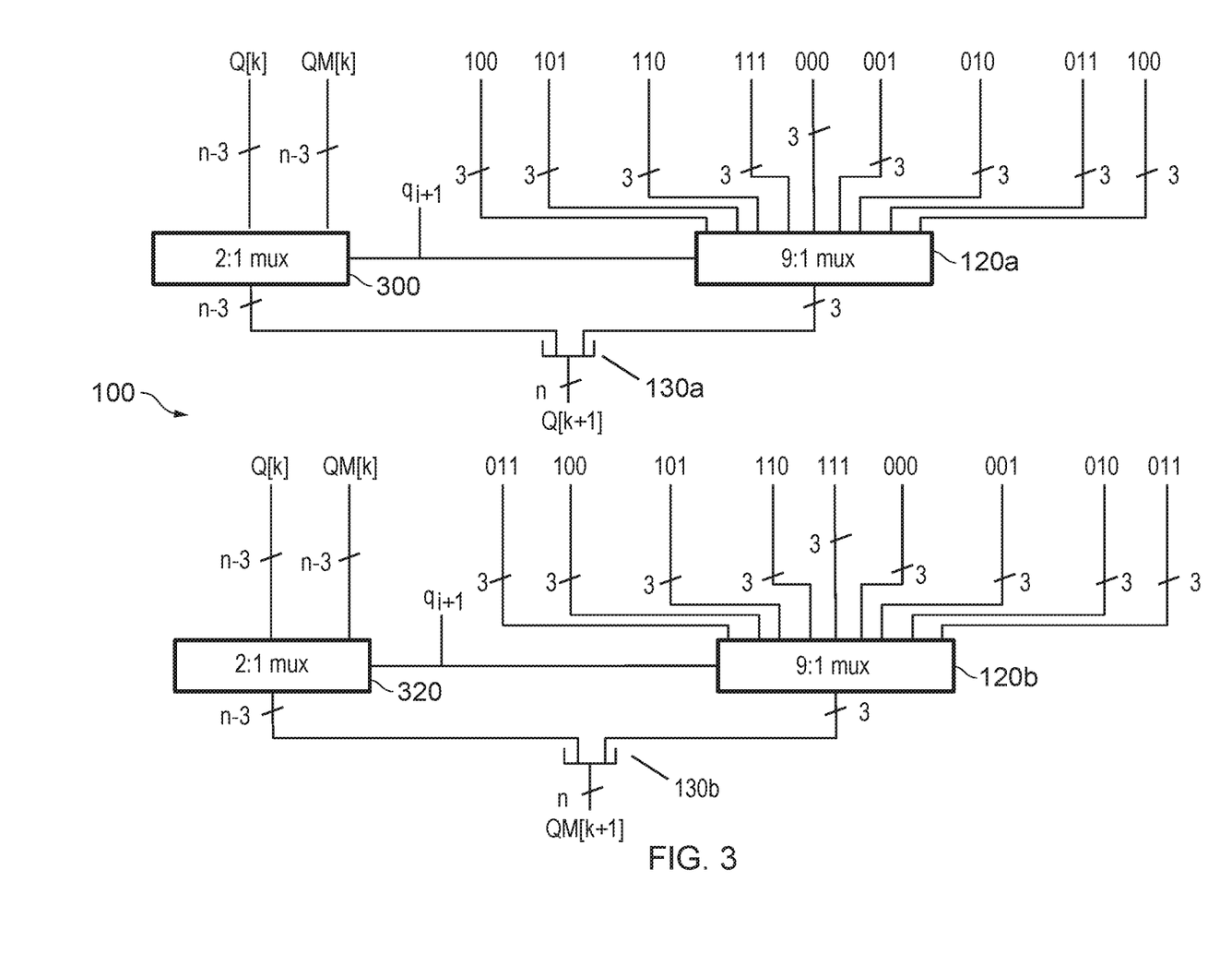
FIG. 3 illustrates an apparatus in accordance with some embodiments.

FIG. 3 illustrates, in the form of a circuit, an example of the data processing apparatus 100 that is capable of performing an on-the-fly conversion to a negative number. The previously described selection circuitry 120 is made up from a pair of multiplexers 120a, 120b. Meanwhile, the previously described concatenation circuitry 130 is made up from a pair of concatenation circuits 130a, 130b. In this way, one of the two conversion circuits 120a, and one of the concatenation circuits 130a are directed towards producing the updated value Q. Meanwhile, the second multiplexer 120b and the second concatenation circuitry 130b are directed towards producing the updated value QM. Note that (except where the signed digit $q_{k+1}$ is 0), when the intermediate data is updated from (Q[k], QM[k]) to (Q[k+1], QM[k+1]), both Q[k+1] and QM[k+1] are changed based on either Q[k] or QM[k].

Accordingly, multiplexers 300, 320 are provided in order to select between Q and QM as the input to update both Q and QM in dependence on the value of the new signed digit $q_{k+1}$.

Figure 4:
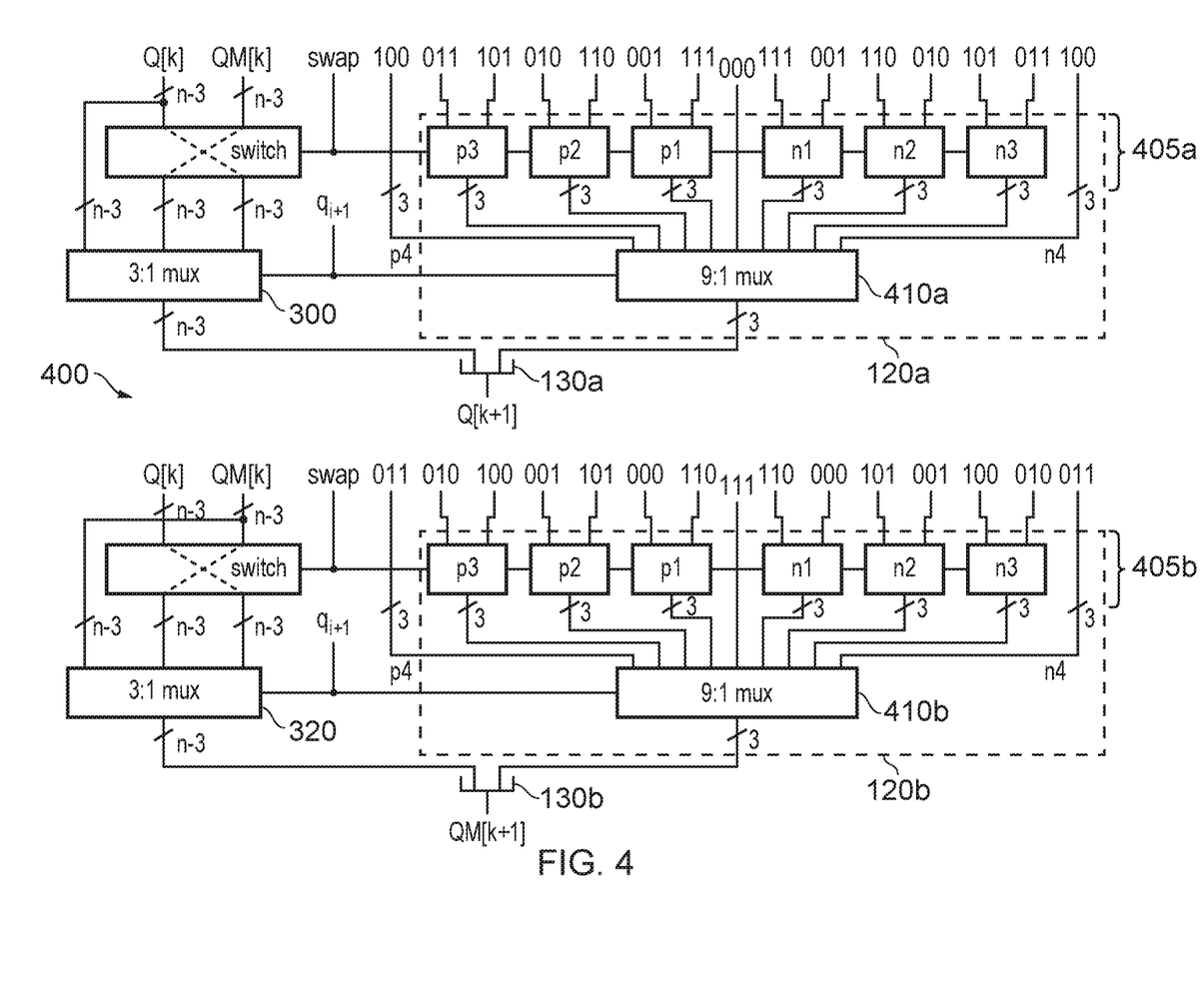
FIG. 4 illustrates an apparatus that speculatively generates candidate values to be concatenated with intermediate data, in accordance with some embodiments.

FIG. 4 illustrates a variant of the data processing apparatus 100. This data processing apparatus 400 is able to convert the previously described signed digit $q_{k+1}$ to an unsigned digit. The conversion is selective in the sense that the conversion can be performed so that the final output (in non-redundant-representation) will be a positive number or a negative number. In this embodiment, the input signal "swap" is provided to indicate whether the final output should be negative or not. This signal therefore chooses between the values of the table 200 for negative conversion and the values of the table 210 for positive conversion. In addition, the signal is used to 'swap' the inputs Q and QM around so that the concatenation is performed on the correct one of Q or QM, depending on whether the output number is to be negative or not, and in dependence on the sign of the signed digit $q_{k+1}$.

One further feature of the embodiment illustrated in FIG. 4 is that part of the conversion process is performed speculatively. That is, before the signed digit is received, a number of candidate unsigned digits are generated in dependence on whether a negative conversion is being performed or not. This speculative generation is collectively performed by sets of multiplexers 405a, 405b. The sets of multiplexers 405a, 405b use the 'swap' signal as a selection signal. In this way, the 'swap' signal chooses either the negative values or the positive values from the tables 200, 210. The candidates are then passed to 9:1 multiplexers 410a, 410b. The candidates received by the 9:1 multiplexers 410a, 410b are therefore the unsigned digits for each possible value of the signed digit $q_{k+1}$ that has yet to be received, and the candidates are either for positive or negative conversion, as selected by the 'swap' signal. Having generated the candidate unsigned digits, a selection between the candidates is made once the signed digit $q_{k+1}$ is finally received. This speculative generation makes it possible to perform part of the conversion process in advance before the signed digit $q_{k+1}$ is received, which removes part of the conversion process from the critical path. In particular, the only process that occurs once the signed digit is received is a selection $q_{k+1}$—no further generation needs to take place and it is not necessary to wait for such generation to take place once the signed digit $q_{k+1}$ is received.

Figure 5:
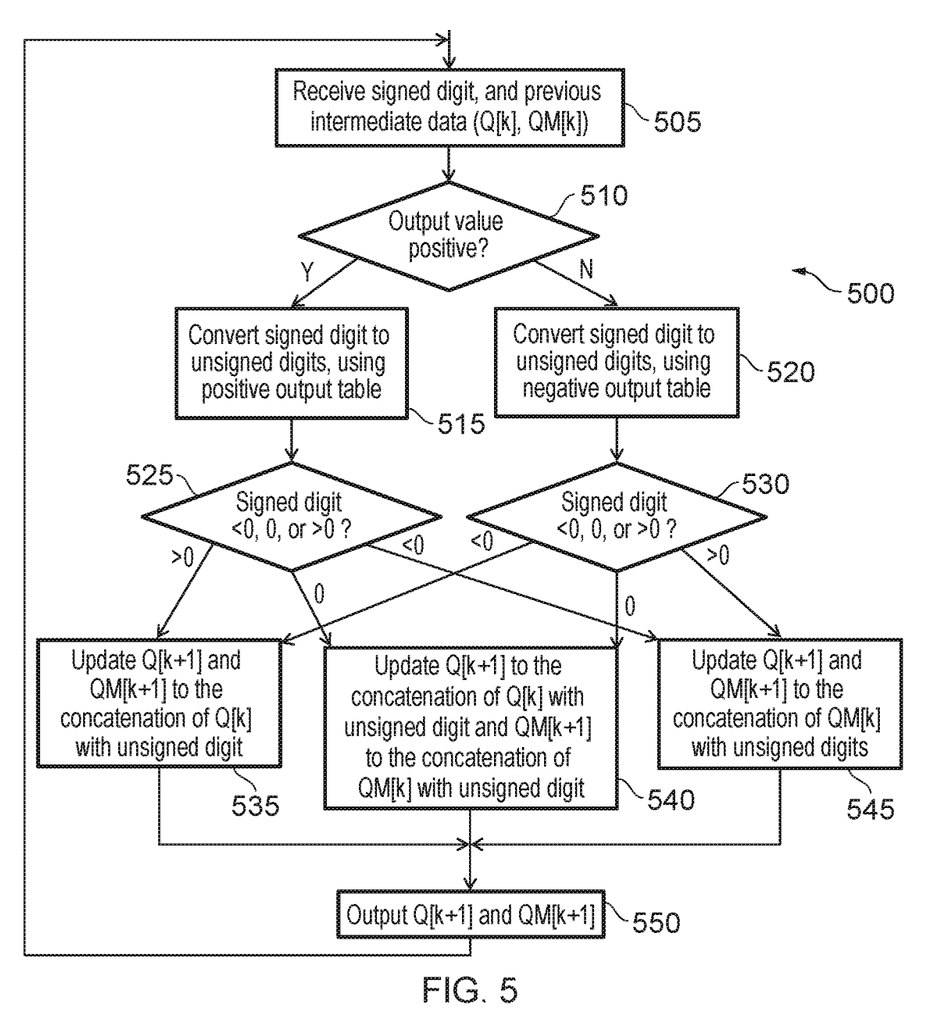
FIG. 5 shows a flowchart that illustrates a method of data processing in accordance with some embodiments.

FIG. 5 illustrates a flow chart 500 that shows a method of data processing in accordance with some embodiments. At step 505, the signed digit is received together with the previous intermediate data Q[k], QM[k]. Note that as previously described with reference to FIG. 4, the receiving of the signed digit $q_{k+1}$ could be delayed. At step 510, it is checked whether the output value (e.g. the final result) is to be positive or negative. If the output value is to be positive, then the signed digit is converted to unsigned digits based on the positive output table 210. Otherwise, at step 520, the signed digit is converted to an unsigned digits based on the negative output table 200. The process then proceeds to either of steps 525 or 530 each of which determines whether the signed digit is less than 0, 0, or greater than 0.

In the case of step 525, if the signed digit $q_{k+1}$ is greater than 0, then at step 535, Q[k+1] is generated by concatenating Q[k] with one of the signed digits, and QM[k+1] is generated by concatenating Q[k] with the other of the signed digits.

If, at step 525, the signed digit $q_{k+1}$ is 0, then at step 540, Q[k+1] is provided by concatenation of Q[k] with one of the unsigned digits and QM[k+1] is provided by the concatenation of QM[k] with the other generated unsigned digit.

If, at step 525, the signed digit $q_{k+1}$ is less than 0, then at step 545, the value of Q[k+1] is generated by concatenating QM[k] with one of the signed digits, and QM[k+1] is generated by concatenating QM[k] with the other of the signed digits.

At step 530, the path taken is inverted. In particular, if the signed digit $q_{k+1}$ at 530 is less than 0, then the process proceeds to the previously explained step 535. If the signed digit $q_{k+1}$ is 0, then the process proceeds to the previously described step 540. And if the signed digit $q_{k+1}$ is greater than 0, then the process proceeds to the previously described step 545.

In any event, having updated Q and QM at any of steps 535, 540, 545, the process proceeds to step 550 where Q[k+1] and QM[k+1] are output. In due course, if the required number of iterations have been performed, then Q[k+1] is output as the final result.

The above embodiments therefore demonstrate how on-the-fly conversion of signed digits to unsigned digits can be performed where the output number made up from the unsigned digits is overall to be negative (or selectively negative and positive). This approach negates the use for addition circuitry, which can consumes additional circuit space and power, and since the conversion takes place on-the-fly, e.g. as each digit is received, the latency is kept low as compared to a situation where all the digits are converted only after they are all received. The embodiments described above therefore preserve space and power consumption and can operate with low latency.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus to convert a plurality of signed digits representing an input value to an output value, the data processing apparatus comprising:
   receiver circuitry to receive, at each of a plurality of iterations, a signed digit from the plurality of signed digits, and previous intermediate data from a previous iteration;
   conversion circuitry to perform a negative-output conversion from the signed digit to an unsigned digit, such that the output value comprising the unsigned digit is negated as compared to the input value;
   concatenation circuitry to concatenate bits of the unsigned digit and bits of the previous intermediate data to produce updated intermediate data; and
   output circuitry to provide the updated intermediate data as previous intermediate data of a next iteration, wherein
   after the plurality of iterations, the output circuitry is adapted to output at least part of the updated intermediate data as the output value, wherein
   the conversion circuitry comprises one or more multiplexers to output the unsigned data in dependence on a value of the signed digit.

2. The data processing apparatus according to claim 1, wherein:
   the receiver circuitry is adapted to also receive an indication of whether the output value is to be negative;
   the conversion circuitry is adapted to perform a positive-output conversion from the signed digit to the unsigned digit, such that the output value comprising the unsigned digit is negated as compared to the input value; and
   the conversion circuitry is adapted to select between the negative-output conversion and the positive-output conversion in dependence on the indication.

3. The data processing apparatus according to claim 1, wherein
   the signed digits are in redundant representation; and
   the output value is in non-redundant representation.

4. The data processing apparatus according to claim 2, comprising:
   selection circuitry to speculatively generate, based on the indication, prior to the signed digit being received, a set of candidate unsigned digits for each possible value of the signed digit, and to select the unsigned digit from the set of candidate unsigned digits once the signed digit is received.

5. The data processing apparatus according to claim 4, wherein
   the selection circuitry is adapted to select the unsigned digit that corresponds with the signed digit from the candidate unsigned digits.

6. The data processing apparatus according to claim 2, wherein
   the previous intermediate data comprises a first value and a second value;
   the conversion circuitry is adapted to perform a further negative-output conversion from the signed digit to a further unsigned digit, and to perform a further positive-output conversion from the signed digit to the further unsigned digit;

the conversion circuitry is adapted to select between the further negative-output conversion and the further positive-output conversion in dependence on the indication; and the updated intermediate data comprises an updated first value and an updated second value.

7. The data processing apparatus according to claim 6, wherein the concatenation circuitry is adapted:

if the signed digit is zero and the indication indicates that the output value is to be negative, to produce the updated first value by concatenating the first value with the unsigned digit and to produce the updated second value by concatenating the second value with the further unsigned digit, and otherwise to produce the updated first value by concatenating one of the first value and the second value with the unsigned digit and to produce the updated second value by concatenating the one of the first value and the second value with the further unsigned digit.

8. The data processing apparatus according to claim 7, wherein the one of the first value and the second value is dependent on whether the signed digit is positive or negative and the indication.

9. The data processing apparatus according to claim 1, wherein the conversion circuitry performs the conversion without addition circuitry.

10. The data processing apparatus according to claim 1, comprising:

digit recurrence circuitry to perform a digit recurrence operation to produce the plurality of signed digits, wherein in each of the plurality of iterations, one of the plurality of signed digits is provided to the receiver circuitry.

11. The data processing apparatus according to claim 1, wherein the output value is an integer.

12. A data processing method to convert a plurality of signed digits representing an input value to an output value, the data processing method comprising:

receiving, at each of a plurality of iterations, a signed digit from the plurality of signed digits, and previous intermediate data from a previous iteration;

performing a negative-output conversion from the signed digit to an unsigned digit, such that the output value comprising the unsigned digit is negated as compared to the input value;

concatenating bits of the unsigned digit and bits of the previous intermediate data to produce updated intermediate data; and providing the updated intermediate data as previous intermediate data of a next iteration, wherein after the plurality of iterations, the updated intermediate data is output as the output value, wherein the performing the negative-output conversion is performed by using one or more multiplexers to output the unsigned data in dependence on a value of the signed digit.

13. A data processing apparatus for converting a plurality of signed digits representing an input value to an output value, the data processing apparatus comprising:

means for receiving, at each of a plurality of iterations, a signed digit from the plurality of signed digits, and previous intermediate data from a previous iteration;

means for performing a negative-output conversion from the signed digit to an unsigned digit, such that the output value comprising the unsigned digit is negated as compared to the input value;

means for concatenating bits of the unsigned digit and bits of the previous intermediate data to produce updated intermediate data; and means for providing the updated intermediate data as previous intermediate data of a next iteration, wherein after the plurality of iterations, the means for providing the updated intermediate data outputs the updated intermediate data as the output value, wherein the means for performing the negative-output conversion comprises one or more multiplexers to output the unsigned data in dependence on a value of the signed digit.

\* \* \* \* \*